United States Patent [19]

Schütt et al.

[11] 4,442,503

[45] Apr. 10, 1984

[54] DEVICE FOR STORING AND DISPLAYING GRAPHIC INFORMATION

[75] Inventors: Dieter Schütt, Munich; Manfred Schwengler, Sindelfingen; Hartmut Ulland, Stuttgart; Helmut H. Weis, Waldenbuch, all of Fed. Rep. of Germany

[73] Assignee: International Business Machines Corporation, Armonk, N.Y.

[21] Appl. No.: 254,711

[22] Filed: Apr. 16, 1981

[30] Foreign Application Priority Data

Apr. 19, 1980 [DE] Fed. Rep. of Germany ....... 3015125

[51] Int. Cl.³ .............................................. G06F 3/14
[52] U.S. Cl. .................... 364/900; 340/747
[58] Field of Search ... 364/200 MS File, 900 MS File; 340/747

[56] References Cited

U.S. PATENT DOCUMENTS

| | | | |
|---|---|---|---|
| 3,893,075 | 7/1975 | Orban et al. | 340/747 X |
| 3,973,245 | 8/1976 | Belser | 340/172.5 |
| 4,090,260 | 5/1978 | Sinobad | 365/237 |
| 4,203,154 | 5/1980 | Lampson et al. | 364/900 X |
| 4,205,389 | 5/1980 | Heartz | 364/200 |

OTHER PUBLICATIONS

Van Voorhis et al., "Memory Systems for Image Processing", *IEEE Transactions on Computers*, vol. C–27, No. 2, Feb. 1978, pp. 113–125.
Bresenham, "Algorithm for Computer Control of a Digital Plotter", *IBM Systems Journal*, vol. 4, No. 1, pp. 25–30, (1965).
Matick, *Computer Storage Systems and Technology*, (Wiley, 1977), pp. 339–341.
Shipiro, "Theoretical Limitations on the Efficient Use of Parallel Memories", *IEEE Transactions on Computers*, vol. C–27, No. 5, May 1978, pp. 421–428.
Overhouse, "On-the-Fly Rearrangement of Area Formatted Data for Display Refresh", *IBM Technical Disclosure Bulletin*, vol. 19, No. 2, Jul. 1976, pp. 683–684.
Kuck, "ILLIAC IV Software and Application Programming", *IEEE Transactions on Computers*, vol. C–17, No. 8, Aug. 1968, pp. 758–770.

*Primary Examiner*—Thomas M. Heckler
*Attorney, Agent, or Firm*—Mark F. Chadurjian; Edward W. Brown; J. Jancin, Jr.

[57] ABSTRACT

A device for storing and displaying graphic information having a storage unit for storing both blocks and rows of data and retrieving rows of data. The storage unit consists of two storage segments, with eight storage modules each, which can operate in an interleaved mode. This permits two-dimensional addressing which consists of distributing the individual elements of a data block over the various separately addressable modules of the storage unit so that no one module contains more than one element of the data block, and that all elements of the data block can be read out in one cycle through simultaneous access of all of the storage modules.

12 Claims, 10 Drawing Figures

FIG. 8 — SHIFT OPERATIONS FOR DATA ALIGNMENT

| ADDRESS BUS BIT A7 A8 A9 | BEFORE STORING | | | AFTER RETRIEVING | | |
|---|---|---|---|---|---|---|
| | 8X8 BIT BLOCKS FROM BLOCKGEN | 32 BIT RECORDS FROM COMPUTER A14=H | A14=L | 64 BIT RECORDS TO DISPLAY CONTROL | 32 BIT RECORDS TO COMPUTER | |
| 0 0 0 | l 0 | r 4 | l 0 | r 2 | r 1 | l 3 |
| 0 0 1 | l 1 | r 3 | l 1 | r 3 | r 2 | l 2 |
| 0 1 0 | l 2 | r 2 | l 2 | l 4 | r 3 | l 1 |
| 0 1 1 | l 3 | r 1 | l 3 | l 3 | r 4 | l 0 |
| 1 0 0 | r 4 | l 0 | r 4 | l 2 | l 3 | r 1 |
| 1 0 1 | r 3 | l 1 | r 3 | l 1 | l 2 | r 2 |
| 1 1 0 | r 2 | l 2 | r 2 | r 0 | l 1 | r 3 |
| 1 1 1 | r 1 | l 3 | r 1 | r 1 | l 0 | r 4 | ln SHIFT TO LEFT BY n POSITIONS    r0 CORRESPONDS TO NOP
rn  "   " RIGHT  "   "              l0   "         "  "

FIG. 5A

| A7 A8 A9 | MODUL 0 | MODUL 1 | MODUL 2 | MODUL 3 | MODUL 4 | MODUL 5 | MODUL 6 | MODUL 7 |
|---|---|---|---|---|---|---|---|---|
| 0 0 0 | 0 0 0 | 0 0 1 | 0 1 0 | 0 1 1 | 1 0 0 | 1 0 1 | 1 1 0 | 1 1 1 |
| 0 0 1 | 1 1 1 | 0 0 0 | 0 0 1 | 0 1 0 | 0 1 1 | 1 0 0 | 1 0 1 | 1 1 0 |
| 0 1 0 | 1 1 0 | 1 1 1 | 0 0 0 | 0 0 1 | 0 1 0 | 0 1 1 | 1 0 0 | 1 0 1 |
| 0 1 1 | 1 0 1 | 1 1 0 | 1 1 1 | 0 0 0 | 0 0 1 | 0 1 0 | 0 1 1 | 1 0 0 |
| 1 0 0 | 1 0 0 | 1 0 1 | 1 1 0 | 1 1 1 | 0 0 0 | 0 0 1 | 0 1 0 | 0 1 1 |
| 1 0 1 | 0 1 1 | 1 0 0 | 1 0 1 | 1 1 0 | 1 1 1 | 0 0 0 | 0 0 1 | 0 1 0 |
| 1 1 0 | 0 1 0 | 0 1 1 | 1 0 0 | 1 0 1 | 1 1 0 | 1 1 1 | 0 0 0 | 0 0 1 |
| 1 1 1 | 0 0 1 | 0 1 0 | 0 1 1 | 1 0 0 | 1 0 1 | 1 1 0 | 1 1 1 | 0 0 0 |
|  | S A R 5 | S A R 6 | S A R 7 |  |  |  |  |  |

FIG. 5B

| A7 A8 A9 | SAR 5 MODUL: 0 1 2 3 4 5 6 7 | SAR 6 0 1 2 3 4 5 6 7 | SAR 7 0 1 2 3 4 5 6 7 |
|---|---|---|---|
| 0 0 0 | 0 0 0 0 1 1 1 1 | 0 0 1 1 0 0 1 1 | 0 1 0 1 0 1 0 1 |
| 0 0 1 | 1 0 0 0 0 1 1 1 | 1 0 0 1 1 0 0 1 | 1 0 1 0 1 0 1 0 |
| 0 1 0 | 1 1 0 0 0 0 1 1 | 1 1 0 0 1 1 0 0 | 0 1 0 1 0 1 0 1 |
| 0 1 1 | 1 1 1 0 0 0 0 1 | 0 1 1 0 0 1 1 0 | 1 0 1 0 1 0 1 0 |
| 1 0 0 | 1 1 1 1 0 0 0 0 | 0 0 1 1 0 0 1 1 | 0 1 0 1 0 1 0 1 |
| 1 0 1 | 0 1 1 1 1 0 0 0 | 1 0 0 1 1 0 0 1 | 1 0 1 0 1 0 1 0 |
| 1 1 0 | 0 0 1 1 1 1 0 0 | 1 1 0 0 1 1 0 0 | 0 1 0 1 0 1 0 1 |
| 1 1 1 | 0 0 0 1 1 1 1 0 | 0 1 1 0 0 1 1 0 | 1 0 1 0 1 0 1 0 |

51, 52, 53

4,442,503

DEVICE FOR STORING AND DISPLAYING GRAPHIC INFORMATION

BACKGROUND OF THE INVENTION

The invention relates to a device for storing and displaying graphic information.

Display and processing of information in the form of graphic data, e.g. diagrams, curves, drawings, etc. are becoming increasingly important, partly in order to render the handling of data processing systems less complicated, and partly because relatively inexpensive equipment is available. However, possible uses are still restricted by the very high storage capacities that are indispensable for storing graphic images.

A graphic display can be made as a matrix-shaped arrangement of numerical values each corresponding to a point of picture field (e.g. screen), and representing a specific grey value or a specific color. For better understanding the following specification discusses only so called digital pictures consisting exclusively of the "colors" and white and being represented by the binary digit Zero and One. A typical representation, e.g. on the screen of a data display device contains 1024×1024 of such black-and-white picture elements and requires for storing a digital storage with a capacity of one megabit.

In spite of its high capacity this storage has to have a short access time. On the one hand, the manipulation of graphic data, e.g. an image rotation or a change of the image scale, requires a high number of storage accesses; and on the other, if so-called raster display devices are used, the individual storage cells have to be read out periodically for refreshing the screen.

Another restrictive condition for storage access is the necessity to connect devices with different characteristics. Digital image information, to give an example, can be produced by scanning an original, as e.g. a written document; in that case the memory, as in the refreshing of the screen, is to be sequentially addressed row by row. The same applies when a computer demands access to the storage. Instead of scanning, however, a graphic display can also be produced in so-called vector generators where the individual elements of figures, e.g. straight lines, circles etc. are generated point by point, and which build these patterns bit by bit in the storage with the corresponding point addresses. The speed of image generation is very high and makes high demands to the access rate in the storage.

For financial reasons it has become necessary to return to the usual word or byte-organized digital storages for the realization of storages for image storing. To reduce the effective access time in the reading-out of data blocks it is known from the article "Memory Systems for Image Processing" by van Voorhis and Morrin in IEEE Transaction on Computers, Vol. C-27, Feb. 1979, pages 113 to 125 to build the image storage of several modules and to distribute the data blocks thereon so skillfully that an entire block with its multitude of digital words can be read out in one single storage access. The strategy of distribution of the individual elements of a data block, and the generation of the storage addresses in writing in and reading out, however, is more complicated and demands a complex structure.

It is therefore the object of the present invention to provide a device for storing and displaying graphic information, where data of different original formats are entered, modified, and read out and which, in spite of a storage of low complexity, permits quick storing and retrieval.

SUMMARY OF THE INVENTION

This object of the present invention is achieved with a storage unit, having a plurality of storage modules, which receive data from a vector generator in block form as well as data from other sources, such as raster scanning an original document, supplied in rows. The stored data are also supplied in rows to a raster display unit. For addressing the individual storage modules in the storage unit, an address conversion circuit is used which is of simple structure and which, without program support, permits the storing of blocks and rows, and the retrieval of storage rows. A further aspect of the present invention is a data modifying unit for modifying data to be stored in the storage unit thereby giving the storage unit greater flexibility.

A still further aspect of the present invention is a buffer storage which permits high speed adaptation between a high speed operating vector generator and the storage unit, and which, as a maximum, reduces the access frequency to the storage unit by a factor of eight.

An advantage of the graphic device of the present invention is that it operates with conventional raster display devices (of the "television" type) which are relatively inexpensive, can display a high amount of information, permit partial erasure as well as color and grey display, and present characters together with vector data.

BRIEF DESCRIPTION OF THE DRAWINGS

FIGS. 5A and B show the individual module address bits generated in two-dimensional addressing;

FIG. 8 shows a survey of the necessary shift operations in the data preparation unit.

DETAILED DESCRIPTION

Figure 1:
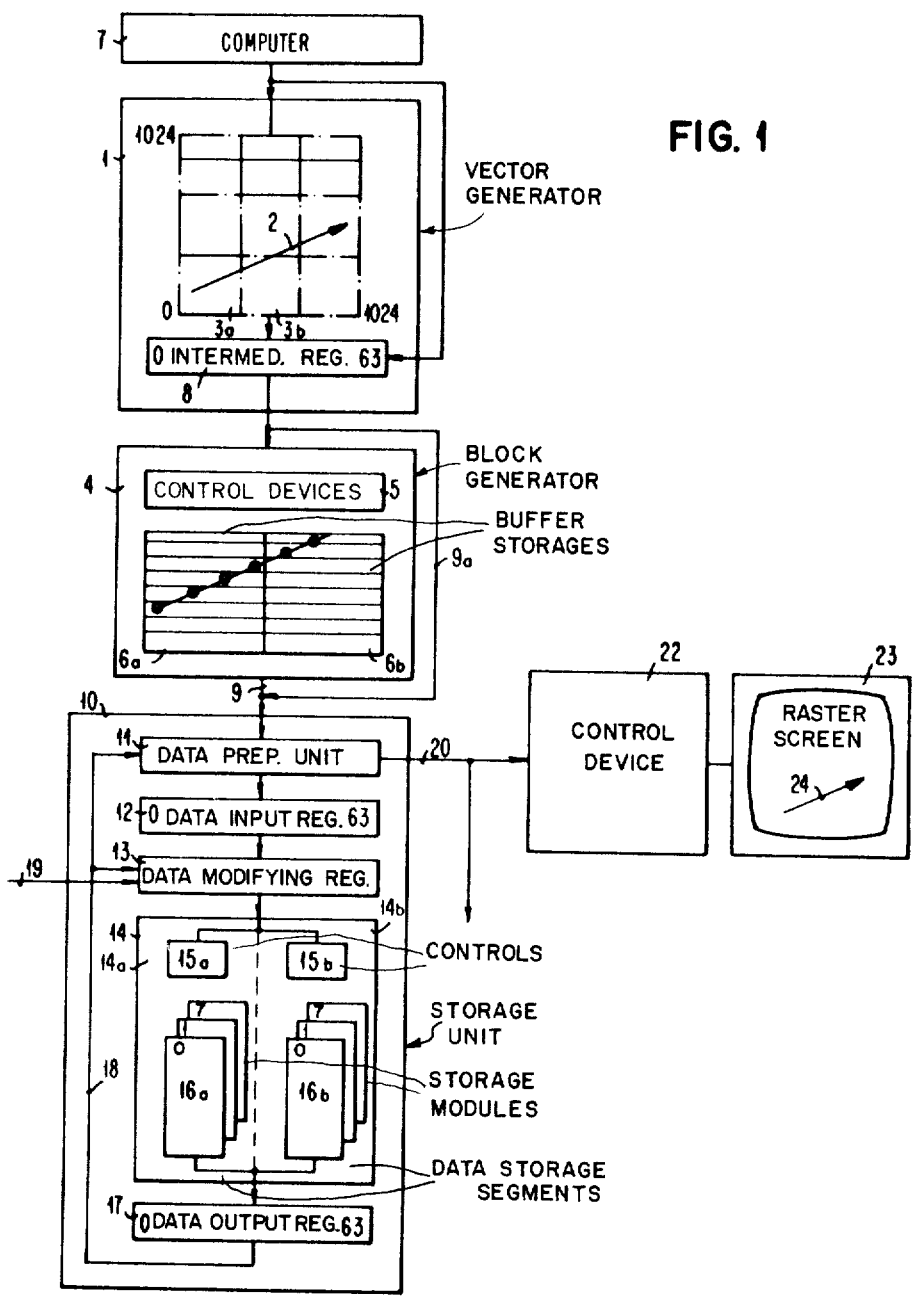
FIG. 1 shows a schematic view of the device for storing and displaying graphic information.

FIG. 1 schematically shows the individual components of a device for storing and displaying graphic information. It consists of the following: a vector generator 1 (which in turn receives instructions from a connected computer 7), a block generator 4, a storage unit 10, a control device 22 for screens, and a raster screen 23.

The information to be displayed, e.g. a vector arrow 2 can originate from various sources: either from vector generator 1, or from computer 7 where it has been entered, e.g., by a scanner. For transmission the computer uses an intermediate register 8 in vector generator 1. These information sources are connected to a storage unit 10 where the information is stored in a digitalized form. For display on a screen 23 operating with the raster principle as in television, the digitally stored information is retrieved and read into a control device 22 for screens where it is converted into corresponding control signals (e.g. voltages for a cathode ray tube) of the screen. Vector generator 1 receives as input from the computer, e.g., the starting and end address of a vector 2; it produces thereof in very quick succession the addresses of the individual points of which vector 2 is composed and thus requires a storage access in an equally quick succession. An example for such an algorithm is described in the publication by J. E. Bresenham "Algorithm for Computer Control of a Digital Plotter", IBM Systems Journal, Vol. 4, No. 1, 1965. The computer supplies the graphic information in the form of rows successively stored in storage unit 10. In both cases, the address (x, y coordinate) of the image points is supplied to data output register 8 of the vector generator.

To reduce the rapid access sequence for the vector generator, the invention proposes to provide between said generator and storage unit 10 a block generator 4 which apart from control devices CTL 5 contains two buffer storages 6a and 6b. The block generator collects a number of addresses (picture elements) supplied by the vector generator, and subsequently re-delivers them to the storage with one single access.

The access time of the two buffer storages is selected in such a manner that it corresponds to the rate with which vector generator 1 can produce vector points. The image field of vector generator 1 (and accordingly of display unit 23) which is schematically shown inside block 1 of FIG. 1, is to comprise, e.g., 1024×1024 points. This total field is divided into individual square image blocks of 8×8 bits characterized by their Cartesian coordinates (x,y) in the image field. If a newly generated vector point falls to a new and still unprocessed block a buffer storage 6a or 6b that is free at that moment is selected and the image of this forming block is generated in said buffer storage. If any vector points produced later fall outside this block, the other buffer in block generator 4 is filled, and the previously filled buffer storage is transferred to storage unit 10 with one single storage access. The contents of a buffer are transferred to the storage also in those cases where the end point of a vector is within the respective block.

FIG. 1 shows a case where vector generator 1 successively generates the points in blocks 3a and 3b of the image field, beginning at the lower left hand corner. In this case, buffer storage 6a is first filled with the vector points generated in block 3a, and transferred into the storage unit when the first point is generated in block 3b. This and the following points are stored in buffer storage 6b until this is filled, too, and buffer storage 6a that had been emptied in the meantime is filled again.

In this manner, the frequency of the accesses from vector generator 1 to storage unit 10 is reduced. The extent of reduction depends on how many vector points are within one block, and with maximum filling of a block it can reach a factor of 8. A typical reduction is in the area between 5 and 6.

In the embodiment, each buffer storage has a capacity of 8×1 byte; the Cartesian coordinates x, y of an image point consist of 10 bits in an image field with 1024×1024 bits. For buffer storage, the 3 low-order bits of the y-address determine the byte location in the buffer, the 3 low-order bits of the x-address determine the respective bit in that byte. The remaining 7 bits of both address parts are kept in address registers and determine that part of the storage where the entire buffer contents are to be stored later.

Bus line 9 between block generator 4 and storage unit 10 has a width of 64 logic bits (in cases of smaller physical line widths several transfer processes are executed successively). The computer requires only a width of 32 logic bits. Intermediate register 8 of vector generator 1 can also be selectively connected via a 32 bit-wide bus line 9a to storage unit 10, avoiding block generator 4.

According to the above specification, storage unit 10 is to be able to store in one storage cycle an entire 64-bit block from block generator 4, or a 32-bit block from the computer. Furthermore, for refreshing the rows of the display device, 64-bit blocks per storage access are to be applied to control device 22. (A row of the image display device operating in accordance with the raster principle comprises 1024 bits and is divided into 16 blocks with 64 bits each).

To satisfy this strict demand, the storage unit realizes a specific address conversion method according to which the image blocks can be distributed over the various storage modules 16a, 16b in such a way that not more than one access is required for each module. This so-called two-dimensional addressing will be described in detail below.

The various components of storage unit 10 are data preparation unit 11, a data input register DI REG 12 for the storage, a data modifying unit 13, two storage segments 14a, 14b each with a control 15a, 15b, and with several storage modules 16a, 16b, as well as a data out register DO REG 17. A bus line 18 connects the output of the data output register to the data modifying unit 13 and data preparation 11.

Unit 11 for data preparation (PREP) consists of several (e.g. 8) shift registers operating under parallel control. Each shift register can operate either serially—the data are stored at one end of the shift register, passed through, and retrieved at the other end—or it can operate as a ring shift register with circulating data. The embodiment shows eight shift registers each with a capacity of 8 8 bits. Each shift register can be loaded in parallel.

The data preparation unit operates in three modi:

1 Data input: The data blocks (8×8 bits) of the block generator, or the 32-bit sets of the other connectable units are stored in the shift registers.

2. Data alignment: When all data has been stored in the shift registers they have to be aligned in a specific manner for the purpose of two-dimensional addressing. This alignment upon storing, and correspondingly in the inverse order upon retrieval is effected when the shift registers of the data preparation unit are cyclically connected; further details will follow (FIG. 8). 3. Data output: After retrieval and alignment, the data is transferred to the respective users. Control device 22 e.g. receives the 64 bits required for image refreshing in four shots with 16 bits each.

Like data output register 17, data input register 12 has a width of 64 bits.

Circuit 13 for data modification (MOD) that is connected to the data input register permits altering or supplementation of the data prior to their being stored in a storage. To give an example: new data reaching unit 13 from DI REG 12 can either fully or partly overwrite the data existing there and read out from the storage via line 18. Similarly, predetermined data in unit 13 can be erased. Corresponding control instructions are applied via line 19.

The actual storage block consists of two segments 14a and 14b which in the embodiment each comprise 8 storage modules 16a, b. These two segments can operate in an interleaved mode. The inputs and outputs of corresponding cards of both segments are interconnected.

The principle of two-dimensional addressing will now be discussed in detail with reference to FIG. 2. The purpose of this addressing method consists in distributing the individual elements of a data block, e.g. of an 8×8 bit block of generator 4, over the various separately addressable modules of storage segments 14a, 14b in such a manner that no module contains more than one block element, and that consequently all elements of a block can be read out in one cycle through a simultaneous access to all storage modules.

Each segment 14a or 14b of the storage consists of 8 storage modules 16a, b marked M0 ... M7 (e.g. separately addressable cards) with an access width of 8 bits each (one byte).

In the following example the storing of 8 blocks B0 .. B7 which are arranged in the image field one beside the other and comprise 8×8 bits each will be discussed.

According to the algorithm selected for address conversion the first eight bits $B_{00}$ are brought from block B0 to address N of module M of the segment, the second eight bits (the second row of block B0) are brought to the address (N+8) of the module (M+1) modulo 8, the third row of the block B0 is brought to address N+16 of the module (M+2) modulo 8, etc. According to FIG. 2A, the elements (bytes) of the first block B0 are distributed over the individual modules of a storage segment to form a staircase pattern.

The next block B1 adjacent to block B0 that has just been stored on the same row of the right-hand picture field is subsequently processed in the same manner; its first byte is set to address N of module (M+1) modulo 8, its second byte to address N+8 of module (M+2) modulo 8, etc. The other blocks B2 to B7 on the same row of field 1 are dissolved in the same manner and written into the various storage modules.

Figure 2A:
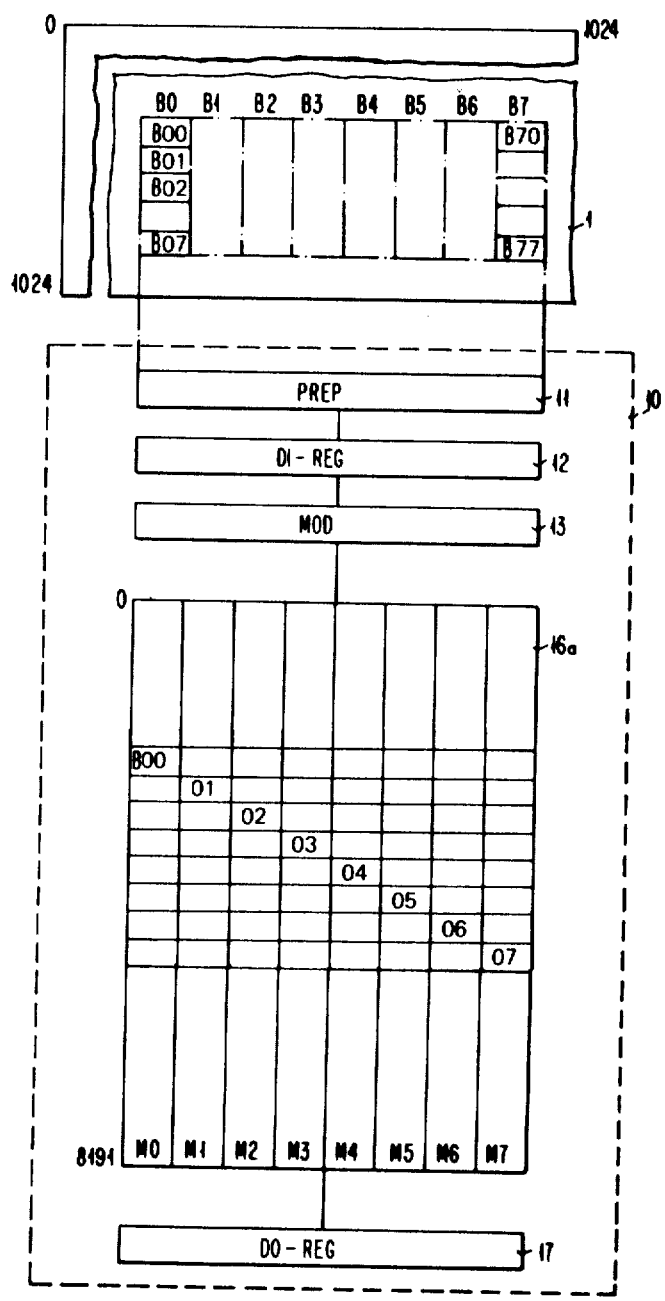
FIGS. 2A and B show a schematic representation of the distribution of data elements of a block over the storage modules of the storage unit when the first or all blocks of a row are stored.

The two part FIGS. A and B of FIG. 2 show the filling of storage modules M0 to M7 of a storage segment 1A at two different times. In FIG. 2A block B0 is stored. Its individual elements (bytes) $B_{00}$ to $B_{07}$ are arranged in a staircase pattern in the storage segment beginning at address N. The block can thus be read in and out in one storage access.

Figure 2B:
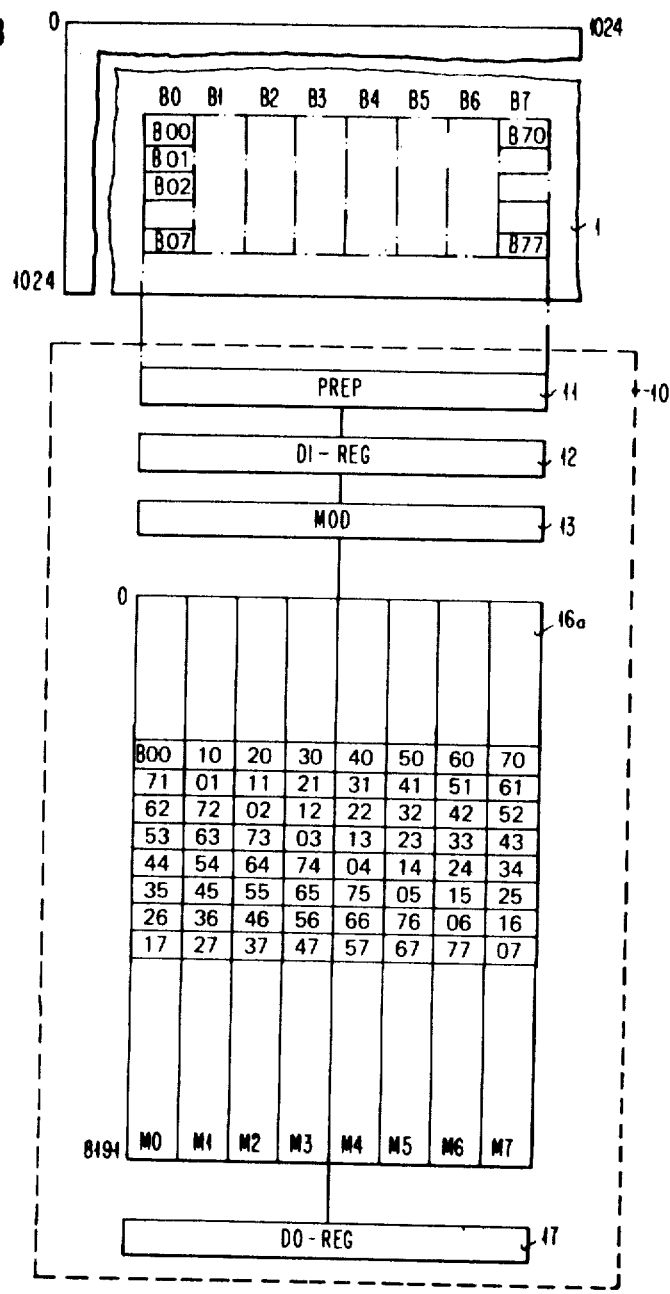

The filling of the modules after the storing of all blocks B0 to B7 of the image field belonging to one 64 bit row is shown in FIG. 2B. It shows that in this method the first bytes of all blocks, i.e., $B_{00}$, $B_{10}$ ... $B_{70}$ are on address N of each module and thus form one continuous storage row. This row can thus be retrieved in one single storage access into the data output register and can then be transferred to the display unit (for its refreshing).

Continuous storage rows can also be stored by addressing all storage modules with the same address N.

The method described here is a simple means for storage writing-in or reading-out both block-wise and row-wise in one single storage cycle. The shifting of the individual block bytes required in block processing is executed, as pointed out above, in data preparation unit 11 in cyclically operating shift registers. The above specification also explains the meaning of the term "two-dimensional addressing": the individual elements of a block are stored on different storage modules (first dimension) and on different addresses (second dimension). Details of address conversion are given below. The system considered comprises a storage with a total capacity of one megabit, and it is divided into two equal segments 14a and 14b each comprising eight storage modules 16a, b with a capacity of eight kilobytes (8K×1 byte).

For addressing this storage 15 address bits are used; the smallest addressable unit in the storage is therefore a data element with 32 bytes. Address bit 13 serves for selecting one of the two segments 14a, 14b.

The addresses are supplied from the following devices connected to the storage unit (FIG. 3):

1. From the block generator: it supplies a 14-bit address (respectively 7 bits X0 bis X6 and Y0 bis Y6 for the two coordinate directions of the screen) in accordance with the 16K blocks of the image field with 8×8 bits each. The address bits are marked A0–A12, A14.

2. From the control unit for the screen: it also supplies a 14-bit address, four bits (x-bits) of one of the 16 64-bit elements marking a row of the screen (with a total of 1024 bits). The remaining 10 bits indicate the row number on the screen.

3. From the computer: it supplies one respective block of 32 bits to the storage unit and generates an address of 15 bits, 4 bits again relating to the x-coordinate.

Figure 3:
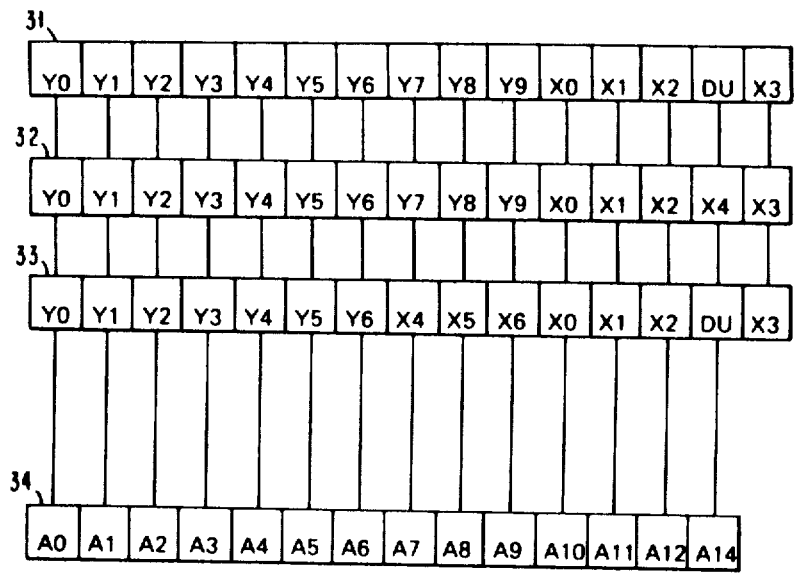
FIG. 3 shows the generation of the storage address from the address signals of different address sources.

The conversion of the addresses x, y supplied by the various address sources into storage addresses A0–A12, A14 is shown in FIG. 3. Block 31 represents the format of an address supplied by the screen control unit, block 32 the address format of the computer, and block 33 the address format of the block generator. Bit $X_3$ serves in all cases for selecting the storage segments; bit DU is of no importance. Block 34 represents the format of the address used in storage unit 10.

This address Ai is stored in the storage address register of the respective storage segment 14a, 14b However, in this form it can not yet be used for addressing the storage modules without there being another address conversion. For this address conversion, selection signals for the individual storage modules and the addresses within each module are generated of the address bits in the storage address register. The bits of these addresses within each module are marked SAR1 to SAR13 (corresponding to the 8K bytes per module). They are generated as follows: of the bits A0 to A6 as well as A10, A11 and A12 of the address the module addresses SAR1 to SAR4 and SAR8 to SAR13 are made. The missing module addresses SAR5, SAR6, SAR7 are computed of bits A7, A8, A9 and A14 of the address, as a function of the source that has supplied the address. There exists three different cases:

Case 1: If there is an access request of the control unit for the screen all eight modules of the selected segment are activated by a signal "module selection", and the storage modules are all addressed with the same address. Bit values A7, A8 and A9 of the address then correspond directly to module addresses SAR5, SAR6, SAR7. Bit A14 is disregarded.

Case 2: In case of access requests from the computer, i.e. when a data set of 32 bits is to be stored, only four storage modules of a segment are to be selected. Which ones of the four modules are selected depends on bits A7, A8, A9 and A14. The correlation is effected in accordance with the following method: bits A14 and A7 of the address are "Exclusive-ORed" and together with bits A8 and A9 present the following correlation:

TABLE 1

| A7 XOR A14 | A8 | A9 | selected modules |
|---|---|---|---|
| 0 | 0 | 0 | 0 1 2 3 |
| 0 | 0 | 1 | 1 2 3 4 |
| 0 | 1 | 0 | 2 3 4 5 |
| 0 | 1 | 1 | 3 4 5 6 |
| 1 | 0 | 0 | 4 5 6 7 |
| 1 | 0 | 1 | 5 6 7 0 |
| 1 | 1 | 0 | 6 7 0 1 |
| 1 | 1 | 1 | 7 0 1 2 |

Case 3: If there is an access request from the block generator, the address is converted in accordance with the above described two-dimensional addressing method. For storing a block all eight modules of a segment are selected but each module is addressed with different address bits SAR5 to SAR7.

The requested combination are shown in FIG. 5A. This table will be described in detail below; it can also be combined in the following algorithm:

If each of the eight modules of a segment has the associated binary address K0, K1, K2 the module address SAR5, SAR6, SAR7 decisive for the respective card is obtained through the binary addition of the following three binary numbers:

|  | $\overline{A7}$ | $\overline{A8}$ | $\overline{A9}$ |  |
|---|---|---|---|---|
| + | K0 | K1 | K2 | (equation 1) |
| + | 0 | 0 | 1 |  |
|  | SAR5 | SAR6 | SAR7 | mod. 8 |

If e.g. the module address for card 5 (K0=1, K1=0, K2=1) is wanted, and if address bits A7, A8, A9 are on 0, 1, 1, the calculation is

|  |  |  | 17 |
|---|---|---|---|
|  | 1 | 0 | 0 |
| + | 1 | 0 | 1 |
| + | 0 | 0 | 0 |
|  | 1 | 0 | 1 | 0 |

So the byte address for module 5 is SAR5=0, SAR6=1, SAR7=0.

As the value of SAR7 in the 10-digit SAR address is $2^3$, the bytes of a block are stored on adjacent cards with a distance of 8 addresses.

Byte 0 of a block is to be stored on that module for which there applies the following relation: K0, K1, K2=A7, A8, A9. For this purpose, the data has first to be aligned in the data preparation unit.

Figure 4:
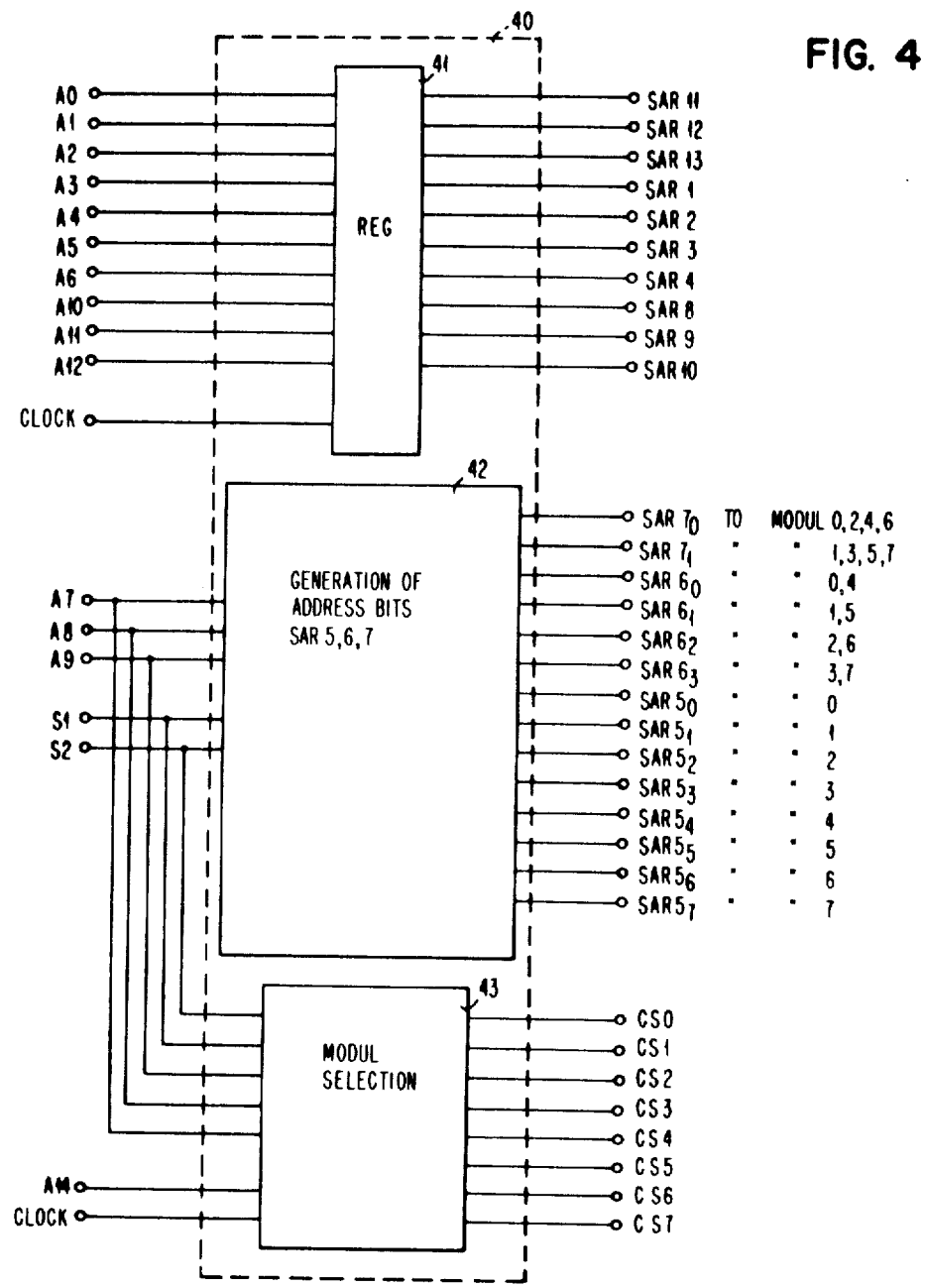
FIG. 4 shows a block circuit diagram of the device for address generation for the modular storage.

All address conversions described above are executed in one single circuit whose block circuit diagram is shown in FIG. 4. The entire conversion circuit 40 consists of a register 41 and two logic circuits 42, 43. Register 41 stores bits A0 to A6 and A10 to A12 of the storage address, and holds them available over the entire storing cycle. These bits correspond to bits SAR1 to SAR4 and SAR8 to SAR13 of the byte address within an 8K-module (see FIG. 4). Logic circuit 42 generates the remaining bits SAR5, SAR6, SAR7 of the byte address for the various modules as a function of the address source using address bits A7 to A9 and two control signals S1, S2. The contents of inputs S1, S2 give the address source in encoded form:

| access request from | S1 | S2 |
|---|---|---|
| control unit | 1 | unimportant |
| computer | 0 | 1 |
| block generator | 0 | 0 |

Logic circuit 43 generates of the same input signals A7 to A9 and S1, S2, together with address bit A14 and suitable time signals the selection signals for the respective modules (cards). Corresponding to the eight modules (cards) eight selection signals CS0 to CS7 are provided.

The actual conversion of the byte part of addresses SAR is effected in circuit 42. Contrary to the other address bits, bits SAR5, SAR6, SAR7 are not applied in parallel to all modules of a segment; instead, they are generated and distributed as a function of the respective active address source as follows:

The (low-order $2^0$) address bit SAR7 is generated twice, as bit SAR70 and SAR71. The former, SAR70, is applied to modules 0, 2, 4, 6, bit SAR71 is applied to modules 1, 3, 5, 7.

Address bit SAR6 is generated four times and distributed over the individual modules as follows:
SAR60 for modules 0,4
SAR61 for modules 1,5
SAR62 for modules 2,6
SAR63 for modules 3,7.

The (high-order $2^2$) address bit SAR5 is generated eight times and is distributed to the following modules individually:
SAR50 for module 0,
SAR51 for module 1,
SAR52 for module 2,
SAR53 for module 3,
SAR54 for module 4,
SAR55 for module 5,
SAR56 for module 6,
SAR57 for module 7.

Output lines SAR5, 6, 7 are activated in accordance with the following algorithm:

Case 1:
Access request of the control unit for the screen (S1=1).

In that case, all eight modules of a segment are activated, and each of these modules receives the same address. All eight output signals CS of circuit 43 are thus active, and circuit 42 delivers address bits A7, A8, A9 unaltered to output lines SAR5, SAR6, SAR7. There applies:
A9=SAR70, 71
A8=SAR60, 61, 62, 63,
A7=SAR50, 51, 52, 53, 54, 55, 56, 57.
Input bit A14 therefore remains unconsidered.

Case 2:
Access request of the computer (S1=0, S2=1).

In that case 32-bit sets are transferred. Circuit 43 selects a group of four of the eight modules of a segment in accordance with the algorithm of table 1. Circuit 42 delivers the address bits A7, A8, A9 in the same manner as in case 1.

Case 3:
Access request from the block generator (S1=0, S2=0).

Here, all modules of the selected segment are activated. All output signals of circuit 43 are applied. However, in that case circuit 42 supplies a different address for each module; these addresses are grouped in FIG. 5A.

The first three columns in FIG. 5A marked A7 to A9 give in eight rows the configuration of the three address bits A7 to A9. For each of these input addresses, circuit 42 generates in the two-dimensional addressing a module address SAR also consisting of three bits, for each of modules 0 to 7. These addresses are given in the accordingly marked sections of FIG. 5A.

The total of all module addresses of FIG. 5A shows certain symmetries which can be advantageously used to simplify address conversion 42. These symmetries are getting more obvious when all address bits SAR of the same order are grouped for all modules. This grouping is shown in FIG. 5B. Block 51 of FIG. 5B contains bits SAR5 of all module addresses, block 52 the bits SAR6 of all module addresses, and block 53 the bits SAR7 of all module addresses. The first bit of the first row in block 51 thus corresponds to the high-order bit SAR5 of the address applied to module 0 when bits A7 to A9 have value 000; the last bit of the last row in block 52 corresponds to the center bit SAR6 of the address applied to module 7 when bits A7 to A9 show the value 111, etc.

Block 51 reveals a symmetry between the four quadrants. The bits of two quadrants touching at one corner are equal, and they are the complement of the bits of the other two quadrants. For obtaining bit filling in accordance with block 51 it is therefore only necessary to generate one of the quadrants through logic circuits from input bits Ai; the bit values in the other quadrants can be derived therefrom either directly or through the forming of complements.

Block 52 can be generated in the same manner by the forming of complements and/or shifting of the 2×2 partial blocks in the upper left hand corner; block 53 even by the forming of complements and/or shifting of the first element of the first row. However, these blocks can also be built in the following manner:

In block 52, column number 2 can be generated through complement formation of column 0, column 4 through complement formation of column 2, column 6 as complement of column 4; similarly, column 3 can be produced as the complement of column 1, column 5 as the complement of column 3, and column 7 as the complement of column 1. Furthermore, the upper half of block 52 equals its lower half.

In block 53, successive columns are obtained from each other by means of complement formation; e.g. column 1 through complement formation of column 0. The same relation also applies with respect to the rows equally formed through the formation of the complement of the respective preceding rows.

Instructions for the detailed utilization of this symmetrical relationship will be included in the specification for circuit 42.

Figure 6:
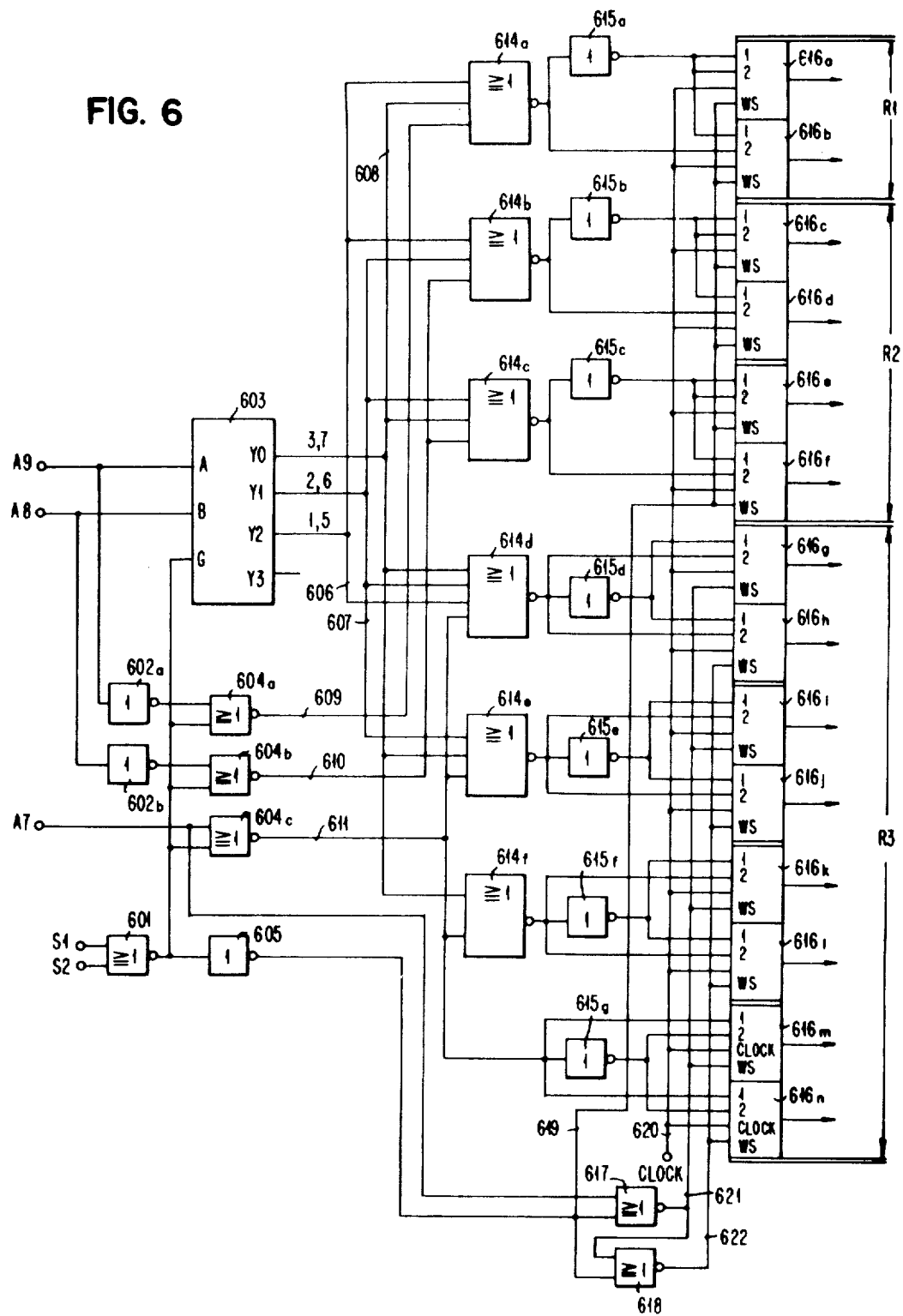
FIG. 6 shows a schematic circuit diagram of the byte selection within a module in the device according to FIG. 4.

FIG. 6 shows the circuit for generating module addresses SAR1 out of input signals A7, A8, A9, S1, S2. In the present embodiment, the circuit operates with a negative logic, i.e. the high level (H=high) corresponds to the logic value 0 of the input signals, the lower level (L=low) corresponds to the logic value 1.

At the output of the circuit, respectively equal-order bits SAR of the generated module addresses are available in three register groups R1, R2, R3. Output signals SAR70, 71 of the two registers in group R1 correspond to module address bits SAR7 grouped in block 53 of FIG. 5b output signals SAR60-63 of the four registers R2 correspond to bits SAR6 shown in block 52, and output signals SAR50-57 of the 8 registers in R3 correspond to values SAR5 shown in block 51.

The output signals of registers 616 correspond to the following address signals:

| R1 | register | 616a | SAR70 |
|----|----------|------|-------|
|    |          | 616b | SAR71 |
| R2 | register | 616c | SAR60 |
|    |          | 616d | SAR61 |
|    |          | 616e | SAR62 |
|    |          | 616f | SAR63 |
| R3 | register | 616g | SAR50 |
|    |          | 616h | SAR51 |
|    |          | 616i | SAR52 |
|    |          | 616j | SAR53 |
|    |          | 616k | SAR54 |
|    |          | 616l | SAR55 |
|    |          | 616m | SAR56 |
|    |          | 616n | SAR57 |

The simple structure of address conversion 42 in accordance with FIG. 6 is obtained from the above discussed symmetry properties within the individual bit groups. As far as possible, all bit configurations A7 to A9 leading to the same output bits within a column of the partial blocks of FIG. 5A have been grouped, and the remaining table values have been derived therefrom by means of complement generation.

The address conversion circuit according to FIG. 6 consists of conventional components, as e.g. inverters, NOR gates, a decoder 603 and several clock controlled latches 616.

Register stages 616 are clock-controlled latches of the SN 74 298 type of Texas Instruments. When a clock pulse (line 620) is applied, they take over the the information on their input line 1 or on their input line 2, depending on the level of the connection WS "word selection". If the connection "word selection" which in the circuit of FIG. 6 is connected to lines 619, 621 or 622 has level L the input signal on line 1 is taken over; if it shows level H the information on input line 2 is latched.

Decoder 603 is e.g. a 2-4 decoder of Texas Instruments, type SN 74 139. This decoder produces four output signals when two input signals are applied. In the present case, the input signals are address bits A8, A9; of the outputs only three are used; the first output signal (Y0, connected to line 608) is activated, i.e. it receives level L (=logic 1) when address bits A3 and A7 have the logic value 1 (level L). There then exists either address A7, A8, A9=011, or 111; in FIG. 6 these values are given as decimal numbers 3 and 7 at the decoder output. The second output signal (Y1, connected to line 607) is activated at (decimal) addresses 2 and 6, the third output signal (Y3, connected to line 606) at (decimal) addresses 1 and 5. The entire decoder circuit 603 is activated when there is at its input G a control signal with level L.

Output line 606 of the decoder is connected to the NOR gates 614a, b, d; line 606 to NOR gates 614b, c, d, e; and line 608 to NOR gates 614a, c, d, e, f. Input signals A9 and A8 are furthermore applied via inverter 602a, b, to a NOR gate 604a, b each, a third NOR gate 604c receives input signal A7 directly.

The second inputs of NOR gates 604 receive the output signal of a NOR gate 601; the output signal of NOR gate 601 also reaches the setting input of decoder 603. The input terminals of NOR gate 601 receive control signals S1, S2 with which the source of address bit A7-A9 is displayed in encoded form.

The output of NOR gate 604a is connected via line 609 to NOR gate 614a; the output of NOR gate 604b is connected via line 610 to NOR gates 614b, c; and the output of NOR gate 604c via line 611 to NOR gates 614d, e, f. Line 611 is furthermore connected directly to inputs 1 of register stage 616m and n, as well as via inverter 615g to inputs 2 of the same register stages. The output of NOR gate 614a is connected via an inverter 615a to input 1 and 2 of register stage 616a, and to input 1 of register stage 616b. The same output of NOR gate 614a is connected directly to input 2 of register stage 616b.

The output of NOR gate 614b is directly connected to input 2 of register 616d, and via an inverter 615b to input 1 of the same stage, as well as to inputs 1 and 2 of stage 616c. In the same manner, the output of NOR gate 614c is connected to the inputs of stages 616e and f. The output of NOR gate 614d is directly connected to the input 2 of stages 616g and h, and via an inverter 615d to inputs 1 of the same register stages. In the same manner, the outputs of NOR gates 614e and f are connected to the inputs of register stages 616i and j, and 616k and 1.

The output of NOR gate 601 is also connected via an inverter 605 to one respective input of NOR gates 617 and 618, as well as to the word selection inputs WS of register stages 616a to f. The second input of NOR gate 617 is connected to address bit A7. The output of NOR gate 617 is connected to the word selection inputs of register stages 616g, i, k, and m, as well as to the second input of NOR gate 618. The output of NOR gate 618 is connected to word selection inputs WS of register stages 616h, j, l, and n.

The operation of address conversion in FIG. 6 will now be described for the three cases where there are different address sources. In an access request by the control unit for the screen, or by the computer (i.e. S1=1, or S1=0, S2=1) the output signal of NOR gate 601 has the level H (value 0) and thus prepares NOR gates 604 for switching. On their way to registers 616, address signals A7 to A9 always pass through an even number of inverter stages so that module addresses SAR$_i$ are equal to the applied address signals A$_i$. To give an example: apart from NOR gate 604c, address signal A7 passes also through NOR gate 614f before being applied to input 2 of register stages 616k and l. These inputs are selected because lines 621 and 622 both show level H in that case. Therefore there appears output value A7 in register stages 616k and l, and thus also on the lines to modules 2 and 6.

Correspondingly, address bit A9 passes through inverter 602a, NOR gate 604a, NOR gate 614a and inverter 615a. Line 619 shows level L so that in register stages 616a and b inputs 1 are selected which are connected to inverter stages 615.

The actual two-dimensional address conversion is effected in the circuit according to FIG. 6 when there is an access request of the block generator. In that case, the output signal of NOR gate 601 shows level L (value 1) so that decoder 603 is activated but NOR gates 604 are off. Inverter 605 generates at the input of NOR gate 617 a level H. This same level is also applied at input WS of register stages 616a to f and activates their second input. The output signal of NOR gate 617 has level H when input bit A7 shows level L. In that case, input signals 2 of register stages 616g, i, k, m are activated. If input bit A7 has level H the output signal of NOR gate 617 activates together with the signal of inverter 605 the output signal with level L of NOR gate 618 and thus activates input signal 1 of register stages 616h, j, l, n.

The generation of output address bits SAR with the circuit according to FIG. 6 will now be described by means of some input combinations A8, A9. If these two bits have the logic value zero (i.e. level value H) none of output signals Y0 to Y2 is activated, i.e. all of these output lines show level H. At their output all NOR gates 614 therefore show level L. The input signal at input 2 of register 616a (which is activated by line 619) is therefore on level H, at input 2 of register 616b on level L. Thus, modules 0, 2, 4, 6 receive an address bit SAR9 with level H in accordance with the logic value zero; modules 1, 3, 5, 7 receive from register stage 616b level L according to logic value 1. Thus, precisely the first row of block 53 is generated which corresponds to this address combination A7-A9.

In the same input combination A8, A9=0,0 levels H reach inputs 2 of register stages 616c, e and levels L reach stages 616d, f. Modules 0, 4 are thus applied with an address bit SAR8 with the logic value zero, modules 2 and 6 with a logic value 1, modules 1 and 5 again with logic value zero, and modules 3 and 7 with logic value 1. This corresponds to the first row of block 52.

With input combination A8, A9 register group R3 supplies different output signals depending on the value of input bit A7. For input signal A7=0 (level H), line 621 in register stage 616 selects input WS1 on which by means of inverter 615d a level H is generated. High-order address bit SAR7 with value zero thus reaches module 0. Accordingly, module 4 receives from register stage 616h directly the output signal from NOR gate 614d at input 2 (which is selected via level L on line 622). At module 4 there consequently appears address bit SAR7 with logic value 1. Accordingly, address bits SAR7 with logic value zero reach modules 1, 2 and 3 for this input address, and address bits SAR7 with value 1 reach modules 5, 6, 7. Thus for input address A7-A9=000 the first row of block 51 is generated and stored in registers 616g to n. If bit A7 changes its value the levels of lines 621 and 622 are exchanged so that the respective other input of register stages 616g to n are selected. The registers then contain the values complementary to those mentioned in the preceding example.

If addresses other than (decimal) zero or 4 are applied decoder 603 activates one of its output lines. The respective addressed NOR gates 614 then generate an output level H applied analogously directly or after inversion to register stages 616. The individual rows of blocks 51-53 shown in FIG. 5B can thus be represented as output signals of register groups R1 to R3.

Figure 7:
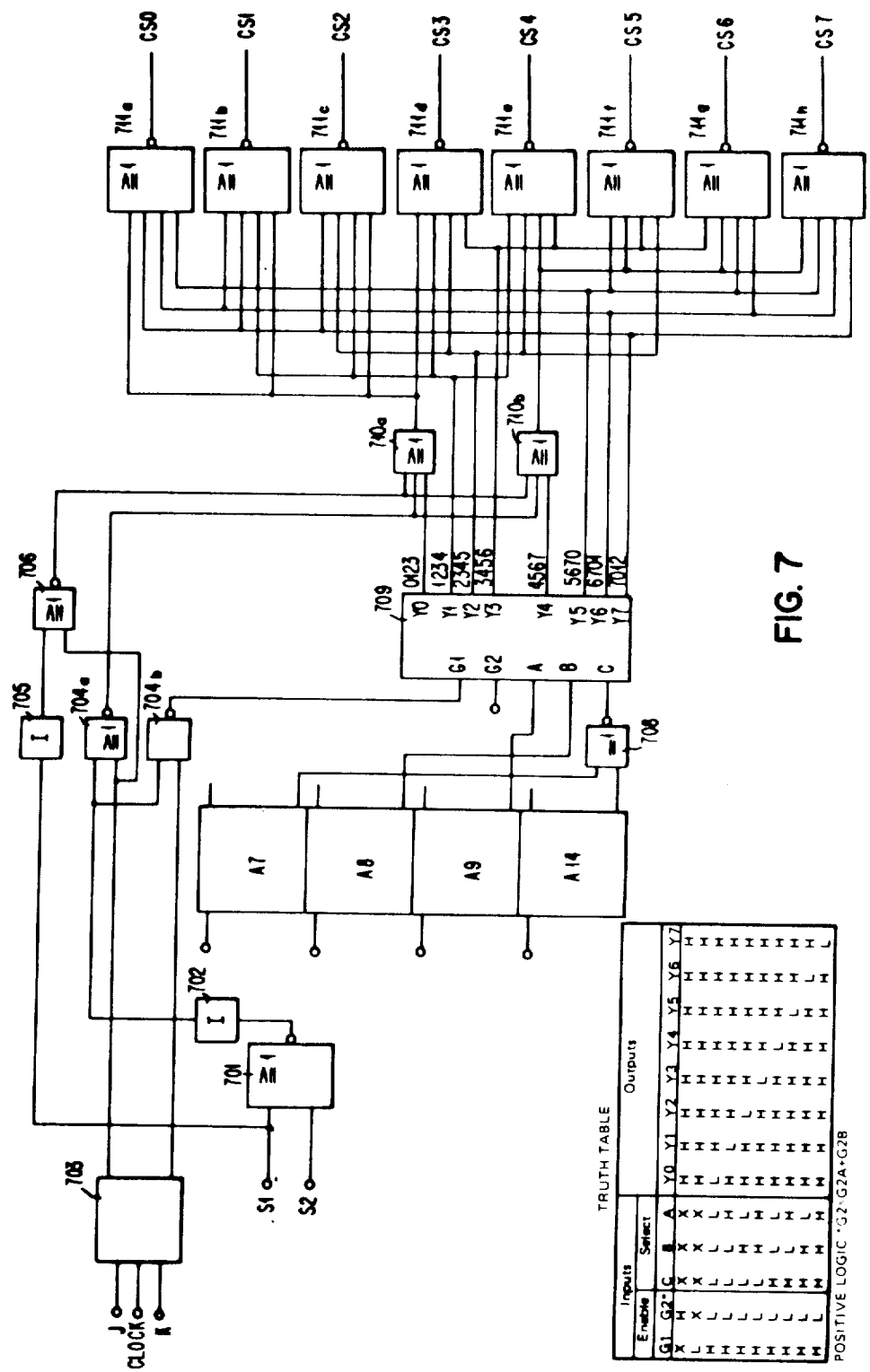
FIG. 7 shows a schematic circuit diagram of the module selection in the device according to FIG. 4.

FIG. 7 shows details of circuits 43 for selecting different storage modules as a function of the unit that is at that moment requesting a storage access. This circuit contains a decoder 709 which associates to 3 input signals A, B, C 8 output signals Y0-Y7. The truth table of this decoder is given in the drawing. Such circuits can e.g. be obtained from Texas Instruments under the part number SN 54 LS 831. Similarly to the circuit of FIG. 6, the circuit of FIG. 7 operates with negative logic (level H=logic value 0). As input signals, this decoder receives address bits A8 and A9 from a register 707, as well as the output signal of an EXCLUSIVE-OR gate 708 where address bits A7 and A14 are received as inputs. The 8 output lines of decoder 709 are applied to 4 of 8 NOR gates 711 whose output represents selection signal CS for one respective storage module. The connections of each output line with the respective NOR gates are determined by table 1. To give an example, output line Y0 is connected with NOR gates 711$a$, $b$, $c$ and $d$ whose output lines are the storage selection signals for modules 0, 1, 2, 3. Thus, the decoder effects a selection of 4 respective modules out of the overall number of 8 storage modules, in such a manner that with altering input addresses A7 to A9 the group of four is exposed to a cyclic permutation in the order 1 to 8; the respective module selection is given in FIG. 7 at output lines Y0–Y7.

In case of accesses of the block generator or of the control unit for the screen all 8 modules are activated; this is effected by means of OR gates 710$a$, $b$ inserted in output lines Y0 and Y4 of the decoder and which each activate 4 NOR gates 711.

The activation of the decoder and of the OR gates 710 is effected by means of the known signals S1 and S2. These are applied to a NOR gate 701 whose output signal reaches via an inverter 702 the inputs of a NOR gate 704$a$ and of a NAND gate 704$b$. The other two inputs of these gates are connected to the positive or to the negative input, respectively, of a clock flipflop 703. The output on NAND gate 704$b$ activates decoder 709 if a level H appears at its input G$_1$; this is the case in the combination S1=H, S2=L. OR gates 710 are both set when either the block generator or the control device request an access (code S$_1$S$_2$=00 or S1=1).

In the above described address conversion the individual blocks are not stored in the storage in their natural order. Prior to writing in and after reading out there consequently is to be a data shift to the left or right in data preparation unit 11 of storage system 10. The extent of that shift depends on the value of the applied address bits A7–A9, and on the unit requesting a storage access. FIG. 8 shows the necessary shift operations. If there is e. g. a write-in request of the block generator with the address A7 A8 A9=011 there is to be a shift to the left by three positions prior to the storage operation.

The remaining elements of the device for graphic information processing do not have to be described here in detail as they can easily be assembled in structural components available in prior art. The control device for the screen, to give an example, operates similarly to an integrated circuit MC 6845 "CRT Controller" of Motorola.

Instead of vector generator 1 it is also possible to install processors with wider functions; such higher graphic functions can also be executed by connected computer 7.

While the invention has been particularly shown and described with reference to preferred embodiments thereof, it will be understood by those skilled in the art that the above and other changes in form and details may be made therein without departing from the spririt and scope of the invention.

Having thus described our invention, what we claim as new, and desire to secure by Letters Patent is:

1. In a device for storing and displaying graphic information with a raster display having an image field, a storage unit comprising:

a plurality of storage modules, each for storing one of a plurality of elements of a plurality of information blocks, each of said plurality of elements representing a row of the image field;

a storage control for addressing said storage modules in a two-dimensional manner, such that (a) said plurality of elements of each of said plurality of information blocks are stored in successive ones of said storage modules, and that (b) the rows of the image field are stored in the modules in such a manner that storage locations of the same address within each of said plurality of storage modules store a row of the image field; and a data preparation unit receiving the graphic information and communicating with said storage control, said data preparation unit aligning the graphic information prior to storage in said plurality of storage modules and aligning in the inverse order graphic information from said plurality of storage modules prior to transferral to the raster display, said data preparation unit comprising a register whose capacity corresponds to at least the size of one of said plurality of information blocks, said register having a feedback for cyclic shifting.

2. The device of claim 1 wherein: said storage unit comprises an address conversion means and at least one storage segment with eight storage modules each, each of said storage modules having an associated binary address (K0, K1, K2,) and wherein a module address (SAR5, SAR6, SAR7) to be selected within one of said storage modules is determined by said address conversion means by applied parts (A7, A8, A9) of the storage address (A0–A12, A14) in accordance with the following logic equation:

|   | $\overline{A7}$ | $\overline{A8}$ | $\overline{A9}$ |   |
|---|---|---|---|---|
| + | K0 | K1 | K2 |   |
| + | 0 | 0 | 1 |   |
|   | SAR5 | SAR6 | SAR7 | modulo 8 |

3. The device as claimed in claim 2 wherein said address conversion means comprises an address generating circuit comprising the following parts:

register stages assembled in groups whose individual output signals each represent a bit of the address within a module, address bits of the same order being associated to a register group, a decoder connected to said register stages and whose output signals are active for those combinations of the applied part (A8, A9) of the storage address which permit production of address bits (SAR), and connecting lines between the output of the decoder and the inputs of the register stages comprising logic gates and inverters for realizing the logic equation in accordance with claim 2, whereby an address is generated from the outputs of register stages.

4. The device of claim 3 wherein further connecting lines with associated logic gates are included with which the applied part (A7, A8, A9) of the storage address can be gated to the register stages without alteration.

5. The device of either claim 2 or 4 wherein said address conversion means comprises a decoder circuit having a truth table for selecting individual modules.

6. The device of claim 5 wherein said circuit for module selection includes a decoder to which parts of the storage address (A7, A8) are applied directly, and further parts (A9, A14) are applied after EXCLUSIVE-ORing, and whose output signals select four respective register stages of a total of eight register stages in such a way that with storage addresses being applied in increasing order there is a cyclic permutation of the selected register stages.

7. The device of claim 3 wherein said address conversion device is connected to a plurality of address sources, each of said address sources producing different access requests for addressing said modules of said storage unit.

8. The device of claim 7, whereas upon an access request for one of said plurality of information blocks said address conversion unit performs an address conversion for the individual storage modules, and whereas upon an access request for a row of said image field said data preparation unit performs a data alignment when the row does not require all modules for storing.

9. The device of claim 2 wherein said address conversion means comprises an address generating circuit having a register with which the unchanged parts (A0 to A6, A10 to A12) of the storage addresses applied are switched onto the modules.

10. The device of claim 1 wherein said storage unit is preceded by a vector generator and a buffer storage, the latter having two alternately operated storage areas with a capacity corresponding to one of said plurality of information blocks of the image field.

11. The device of claim 1 wherein said storage unit is connected to a computer supplying row-shaped sectors of the image field.

12. The device of claim 1, wherein said storage unit contains a unit for data modification which, with external signal control, alters some or all of the data from said data preparation unit prior to being stored in the storage.

* * * * *